US012665456B2

(12) United States Patent
Bossi et al.

(10) Patent No.: US 12,665,456 B2
(45) Date of Patent: Jun. 23, 2026

(54) SYSTEMS FOR ECCENTRIC ANNULAR COVER FOR STATOR END WINDINGS

(71) Applicant: BorgWarner Luxembourg Automotive Systems SA, Bascharage (LU)

(72) Inventors: Adrien Bossi, Cosnes et Romain (FR); Eric Bourniche, Preutin-Higny (FR)

(73) Assignee: BorgWarner Luxembourg Automotive Systems SA, Bascharage (LU)

( * ) Notice: Subject to any disclaimer, the term of this patent is extended or adjusted under 35 U.S.C. 154(b) by 231 days.

(21) Appl. No.: 18/645,643

(22) Filed: Apr. 25, 2024

(65) Prior Publication Data

US 2025/0337293 A1      Oct. 30, 2025

(51) Int. Cl.
| | |
|---|---|
| *H02K 3/24* | (2006.01) |
| *H02K 1/18* | (2006.01) |
| *H02K 3/38* | (2006.01) |
| *H02K 11/00* | (2016.01) |

(52) U.S. Cl.
CPC ................. *H02K 3/24* (2013.01); *H02K 1/18* (2013.01); *H02K 3/38* (2013.01); *H02K 11/0094* (2013.01); *H02K 2213/03* (2013.01)

(58) Field of Classification Search
CPC .. H02K 3/24; H02K 1/18; H02K 3/38; H02K 11/0094; H02K 2213/03; H02K 9/197
USPC ................................................... 310/52, 54
See application file for complete search history.

(56) References Cited

U.S. PATENT DOCUMENTS

| | | | | |
|---|---|---|---|---|
| 8,093,770 | B1 * | 1/2012 | Berhan ..................... | H02K 9/19 |
| | | | | 310/58 |
| 10,008,907 | B2 | 6/2018 | Hanumalagutti et al. | |
| 10,086,538 | B2 | 10/2018 | Hanumalagutti et al. | |
| 10,097,066 | B2 | 10/2018 | Hanumalagutti et al. | |
| 2005/0151429 | A1 * | 7/2005 | Taketsuna ................ | H02K 3/24 |
| | | | | 310/54 |
| 2006/0119196 | A1 * | 6/2006 | Konishi ................... | H02K 3/24 |
| | | | | 310/64 |

(Continued)

FOREIGN PATENT DOCUMENTS

| | | |
|---|---|---|
| DE | 102018000875 B4 | 8/2019 |
| DE | 102020206333 A1 | 11/2021 |

(Continued)

OTHER PUBLICATIONS

Krolik Tomasz (DE102018130687A1) (Year: 2020).*

Primary Examiner — Ahmed Elnakib
(74) Attorney, Agent, or Firm — Joshua M. Haines; Bookoff McAndrews, PLLC

(57) ABSTRACT

A system may include a rotor, a stator disposed around the rotor, the stator includes a stator core and windings, the windings include end windings extending from a longitudinal end of the stator core. A system may include a cover for the end windings and disposed around the rotor, the cover is configured to transfer a cooling fluid to cool the end windings, and the cover includes: a body to cover the end windings, the body including a cavity for the cooling fluid, an inlet disposed in the body for the cooling fluid to enter the cavity; and an outlet disposed in the body for the cooling fluid to exit the cavity, the outlet is disposed at a portion of the body opposite to the inlet, a first radial width of the cavity at the inlet is greater than a second radial width of the cavity at the outlet.

20 Claims, 6 Drawing Sheets

(56)                 References Cited

U.S. PATENT DOCUMENTS

2013/0126143 A1 *   5/2013  Sheu ........................ F28F 1/00
                                                                  165/177
2017/0310189 A1 *  10/2017  Hanumalagutti ...... H02K 5/203
2020/0355447 A1 *  11/2020  Rippel ................. F28D 1/0473
2023/0369922 A1 *  11/2023  Harmon-Moore ....... H02K 9/19

FOREIGN PATENT DOCUMENTS

WO          2022215965  A1    10/2022
WO          2022219268  A1    10/2022
WO          2022219269  A1    10/2022

* cited by examiner

SYSTEMS FOR ECCENTRIC ANNULAR COVER FOR STATOR END WINDINGS

TECHNICAL FIELD

Various embodiments of the present disclosure relate generally to systems for cooling stator windings, and, more particularly, to systems for an eccentric annular cover for stator end windings.

BACKGROUND

A stator winding is a primary heat source in high power motors and may be the major challenge in cooling system design. Controlling the temperature is important for safe operation, and as the resistance of the winding increases with higher temperature, the motor efficiency is lowered.

The present disclosure is directed to overcoming one or more of these above-referenced challenges.

SUMMARY OF THE DISCLOSURE

In some aspects, the techniques described herein relate to a system including: a motor including: a rotor; a stator disposed around the rotor, wherein the stator includes a stator core and one or more windings, wherein the one or more windings include one or more end windings extending from a longitudinal end of the stator core; and a cover for the one or more end windings and disposed around the rotor, wherein the cover is configured to transfer a cooling fluid to cool the one or more end windings, and wherein the cover includes: a body to cover the one or more end windings, the body including a cavity for the cooling fluid; an inlet disposed in the body for the cooling fluid to enter the cavity; and an outlet disposed in the body for the cooling fluid to exit the cavity, wherein the outlet is disposed at a portion of the body opposite to the inlet, wherein a first radial width of the cavity at the inlet is greater than a second radial width of the cavity at the outlet.

In some aspects, the techniques described herein relate to a system, wherein a radial width of the cavity is variable from the first radial width to the second radial width based on an angular position in the cavity.

In some aspects, the techniques described herein relate to a system, wherein the cover is connected to the stator core.

In some aspects, the techniques described herein relate to a system, wherein the first radial width of the cavity includes a first gap between an inner surface of the cavity at the inlet and the one or more end windings and a second gap between the one or more end windings and an inner surface of a central opening of the cover at the inlet.

In some aspects, the techniques described herein relate to a system, wherein the second radial width includes a third gap between the inner surface of the cavity at the outlet and the one or more end windings and a fourth gap between the one or more end windings and an inner surface of the central opening of the cover at the outlet.

In some aspects, the techniques described herein relate to a system, wherein the first gap and the second gap are configured to transfer cooling fluid.

In some aspects, the techniques described herein relate to a system, wherein the first gap is from approximately one millimeter to approximately ten millimeters.

In some aspects, the techniques described herein relate to a system, wherein the first radial width and the second radial width include an eccentricity value.

In some aspects, the techniques described herein relate to a system, wherein the eccentricity value is greater than zero millimeters and less than five millimeters.

In some aspects, the techniques described herein relate to a system, wherein a cooling fluid pressure drop in the cover is substantially constant.

In some aspects, the techniques described herein relate to a system, further including: an inverter to convert DC power from a battery to AC power to drive the motor; and the battery configured to supply the DC power to the inverter, wherein the system is provided as a vehicle including the inverter, the battery, and the motor.

In some aspects, the techniques described herein relate to a system including: a stator including: a stator core; one or more windings, wherein the one or more windings include one or more end windings extending from a longitudinal end of the stator core; and a cover for the one or more end windings and to be disposed around a rotor, wherein the cover is configured to transfer a cooling fluid to cool the one or more end windings, and wherein the cover includes: a body to cover the one or more end windings, the body including a cavity for the cooling fluid; an inlet disposed in the body for the cooling fluid to enter the cavity; and an outlet disposed in the body for the cooling fluid to exit the cavity, wherein the outlet is disposed at a portion of the body opposite to the inlet, wherein a first radial width of the cavity at the inlet is greater than a second radial width of the cavity at the outlet.

In some aspects, the techniques described herein relate to a system, wherein the cover is connected to the stator core.

In some aspects, the techniques described herein relate to a system, wherein the first radial width of the cavity includes a first gap between an inner surface of the cavity at the inlet and the one or more end windings and a second gap between the one or more end windings and an inner surface of a central opening of the cover at the inlet.

In some aspects, the techniques described herein relate to a system, wherein the first gap is from approximately one millimeter to approximately ten millimeters.

In some aspects, the techniques described herein relate to a system including: a cover including: a body to be disposed around a rotor and to cover one or more end windings extending from a longitudinal end of a stator core, the body including a cavity for a cooling fluid; an inlet disposed in the body for the cooling fluid to enter the cavity; and an outlet disposed in the body for the cooling fluid to exit the cavity, wherein the outlet is disposed at a portion of the body opposite to the inlet, wherein a first radial width of the cavity at the inlet is greater than a second radial width of the cavity at the outlet.

In some aspects, the techniques described herein relate to a system, wherein a radial width of the cavity is variable from the first radial width to the second radial width based on an angular position in the cavity.

In some aspects, the techniques described herein relate to a system, wherein the first radial width of the cavity includes a first gap between an inner surface of the cavity at the inlet and the one or more end windings and a second gap between the one or more end windings and an inner surface of a central opening of the cover at the inlet, wherein the first gap is from approximately one millimeter to approximately ten millimeters.

In some aspects, the techniques described herein relate to a system, wherein the second radial width of the cavity includes a third gap between the inner surface of the cavity at the outlet and the one or more end windings and a fourth gap between the one or more end windings and an inner surface of the central opening of the cover at the outlet.

In some aspects, the techniques described herein relate to a system, wherein the first gap is from approximately one millimeter to approximately ten millimeters.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
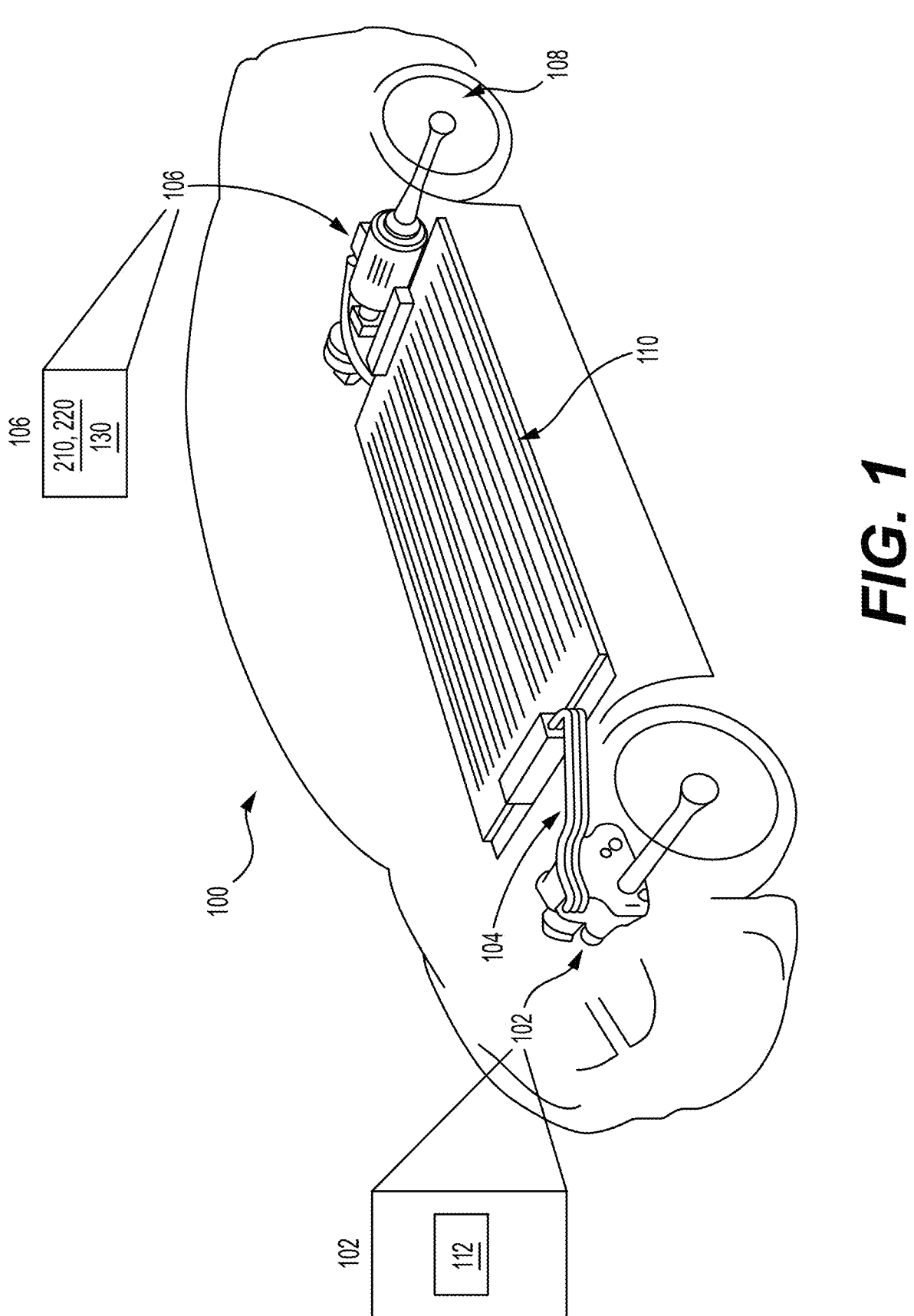
FIG. 1 depicts an exemplary system infrastructure for a vehicle including a motor, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

A stator winding is a primary heat source in high power motors and may be the major challenge in cooling system design. Controlling the temperature is important for safe operation, and as the resistance of the winding increases with higher temperature, the motor efficiency is lowered. Some cooling methods include air-cooled motors, such as those used in industrial applications, which use a fan that blows air onto the motor housing, thereby cooling the motor. However, the cooling performance is low. Some methods use liquid cooling, which is a more effective way to extract the heat from the motor. This method uses an external coolant jacket presented on the outer diameter of the stator. An advantage of this method is the ease of integration, but a disadvantage of this method is the heat is not directly removed from the source (i.e. the windings) and the stator thermal inertia may reduce the cooling efficiency, especially in peak conditions. Some methods use dielectric coolants to cool the electric motor (e.g., an EMachine) by directly impinging the windings and the critical surfaces (e.g., magnet, bus bar, etc.). In this method, special care is needed to get the correct coolant routing to uniformly contact the surface of interest. Non-exposed surfaces may see hot temperature spots, which may lead to potential motor failure. Some methods use immersive cooling, where components are fully immersed in a dielectric coolant. This method is the most effective way to cool, because no air is present in the system and the heat transfer is done by a single fluid.

Cooling the end winding of a stator may be critical, and overmold integrated inserts and annular covers may be used to fully immerse the stator end windings while keeping the airgap free of liquid, thus avoiding high windage losses. For example, cold coolant from a heat exchanger enters the stator end winding volume, extracts the heat, and leaves the volume to return to the heat exchanger. However, even if this cooling concept is very efficient, the coolant may include significant temperature gradient, particularly between the inlet and outlet ports, which may reduce the cooling performance. In addition, pressure drop may be a concern because high fluid velocity is needed to increase the convective heat transfer coefficient.

One or more embodiments may include an annular cover eccentrically mounted to cool the end windings of a motor, or an electric machine (e.g., EMachine). For example, the eccentricity ratio may be adjusted to fine tune the thermal behavior of the stator end windings. The thermal equation for the assembly may include:

$$T_W(\theta) = \frac{Q}{h(\theta)A} + T_C(\theta)$$

Eccentricity modifies the tangential coolant velocity "$v_t$" for each angular sector. This velocity modification is a function of radial distance between the stator end windings and cover. For example, the higher the distance between the windings and cover, the lower the velocity and vice versa, which is modified by eccentricity. Using the thermal equation above, for a given heat flow generated by winding losses "Q" and a fixed winding surface "A", the velocity has a direct impact on convective heat transfer coefficient "h", where both angular coolant "$T_c$" and winding temperatures "$T_w$" are impacted. The use of an annular cover gives a constant tangential velocity, leading to a constant heat transfer coefficient. However, the fluid temperature gradually increases while approaching the outlet, leading to winding temperature increases on the outlet side of the stator and end windings.

One or more embodiments may include eccentricity of the annular cover to compensate for this effect by gradually adjusting the heat transfer coefficient $h(\theta)$. It may be important to ensure setting a correct eccentricity value to avoid any significant additional pressure drop. An advantage of incorporating eccentricity into an annular cover is the ability to reduce the temperature spread of the windings during operation (corresponding to $T_{w\_max}-T_{w\_min}$). For example, the overall winding temperature may be reduced, which may allow the motor to be driven with more current and may allow the motor to achieve a higher continuous power. Additional advantages may be delivering more continuous power and torque, and/or increased efficiency ratio peaks/continuous of approximately 1.

One or more embodiments may include a rounded shape annular cover. One or more embodiments may include other shapes (e.g., radial distance between winding and cover varying with theta angle). One or more embodiments may include adjusting the eccentricity value to limit the coolant pressure drop, and thus the hydraulic losses. For example, the smaller the gap, the higher the heat transfer and hydraulic losses.

Figures 2A, 2B:
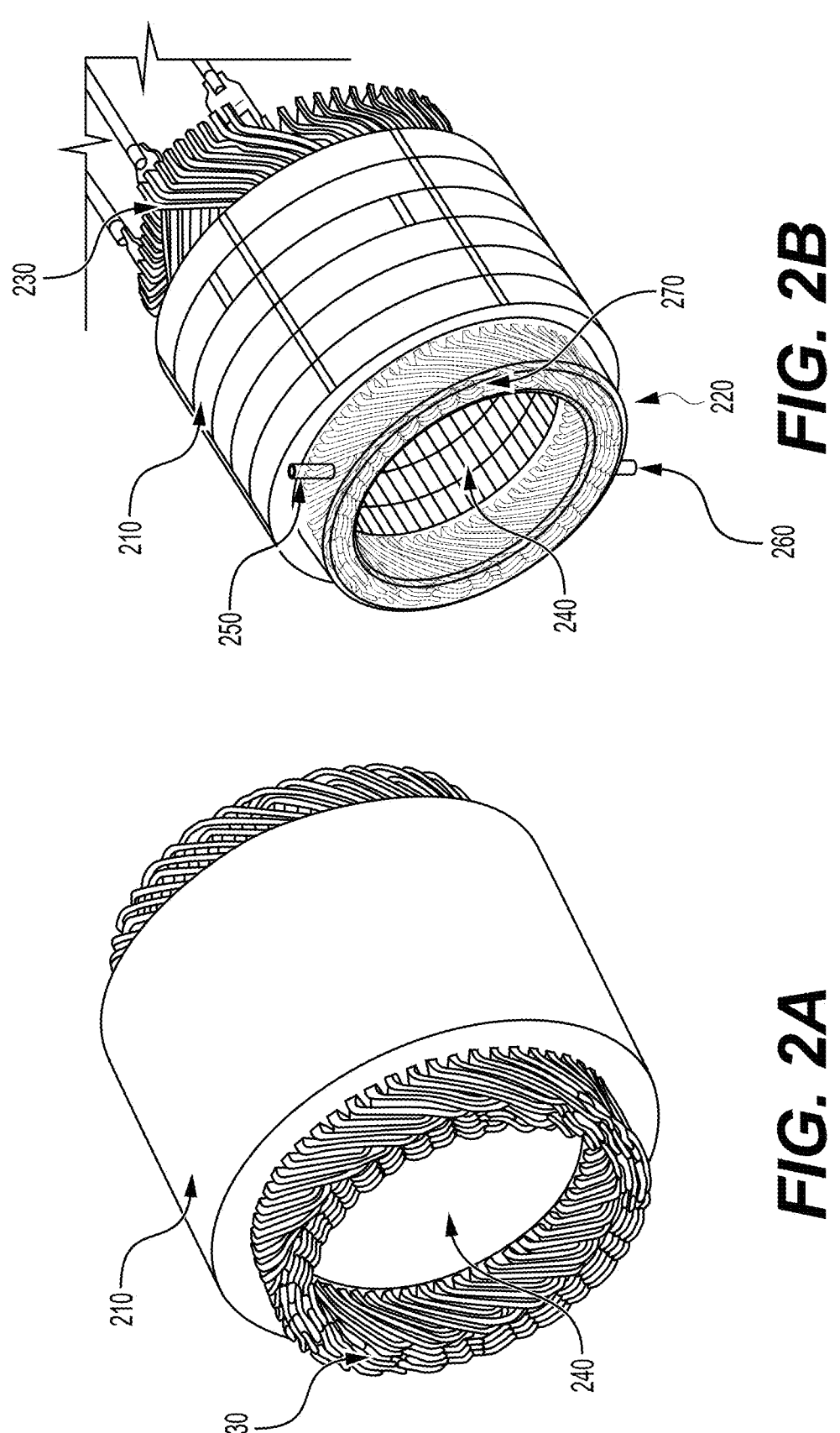
FIG. 2A and FIG. 2B depict exemplary components of a stator and eccentric annular cover, according to one or more embodiments.

FIG. 1 depicts an exemplary system infrastructure for a vehicle including a motor, according to one or more embodiments. Electric vehicle 100 may include inverter 102, connectors 104, drive motor 106, wheels 108, and battery 110. The inverter 102 may include power module 112. Connectors 104 may connect the inverter 102 and battery 110. Battery 110 may supply DC power to inverter 102. Inverter 102 may include components to receive electrical power from an external source and output electrical power to charge battery 110 of electric vehicle 100. Inverter 102, through the use of a power module 112, may convert DC power from battery 110 in electric vehicle 100 to AC power, to power the drive motor 106 and wheels 108 of electric vehicle 100, for example, but the embodiments are not limited thereto. The inverter 102 may be bidirectional, and may convert DC power to AC power, or convert AC power to DC power, such as during regenerative braking, for example. Inverter 102 may be a single-phase inverter, or a multi-phase inverter, such as a three-phase inverter, for example. The drive motor 106 may include a rotor 130 and a stator (e.g., a stator 210 and a cover 220 as depicted in FIG. 2A and FIG. 2B). One or more embodiments may include a system provided as electric vehicle 100 including inverter 102, battery 110, and drive motor 106.

FIG. 2A and FIG. 2B depict exemplary components of a stator and eccentric annular cover, according to one or more embodiments. As depicted in FIG. 2A, stator 210 may include windings 230 and central opening 240. Windings 230 may extend in a longitudinal direction in stator 210. Windings 230 may include an end portion extending from a longitudinal end of a stator core (e.g. stator core 430) of the stator 210, and the end portion may hereinafter be referred to as end windings. As depicted in FIG. 2B, stator 210 may include windings 230, cover 220, and central opening 240. Cover 220 may include inlet 250 and outlet 260. Inlet 250 may include a single inlet or a plurality of inlets. Outlet 260 may include a single inlet or a plurality of outlets. Inlet 250 may be disposed at a first portion of the body 270 of cover 220. Outlet 260 may be disposed at a second portion of the body 270 of cover 220 opposite to inlet 250. Cooling fluid may enter the body 270 of cover 220 through inlet 250 to cool windings 230 and exit the body 270 of cover 220 through outlet 260.

Figures 3A, 3B:
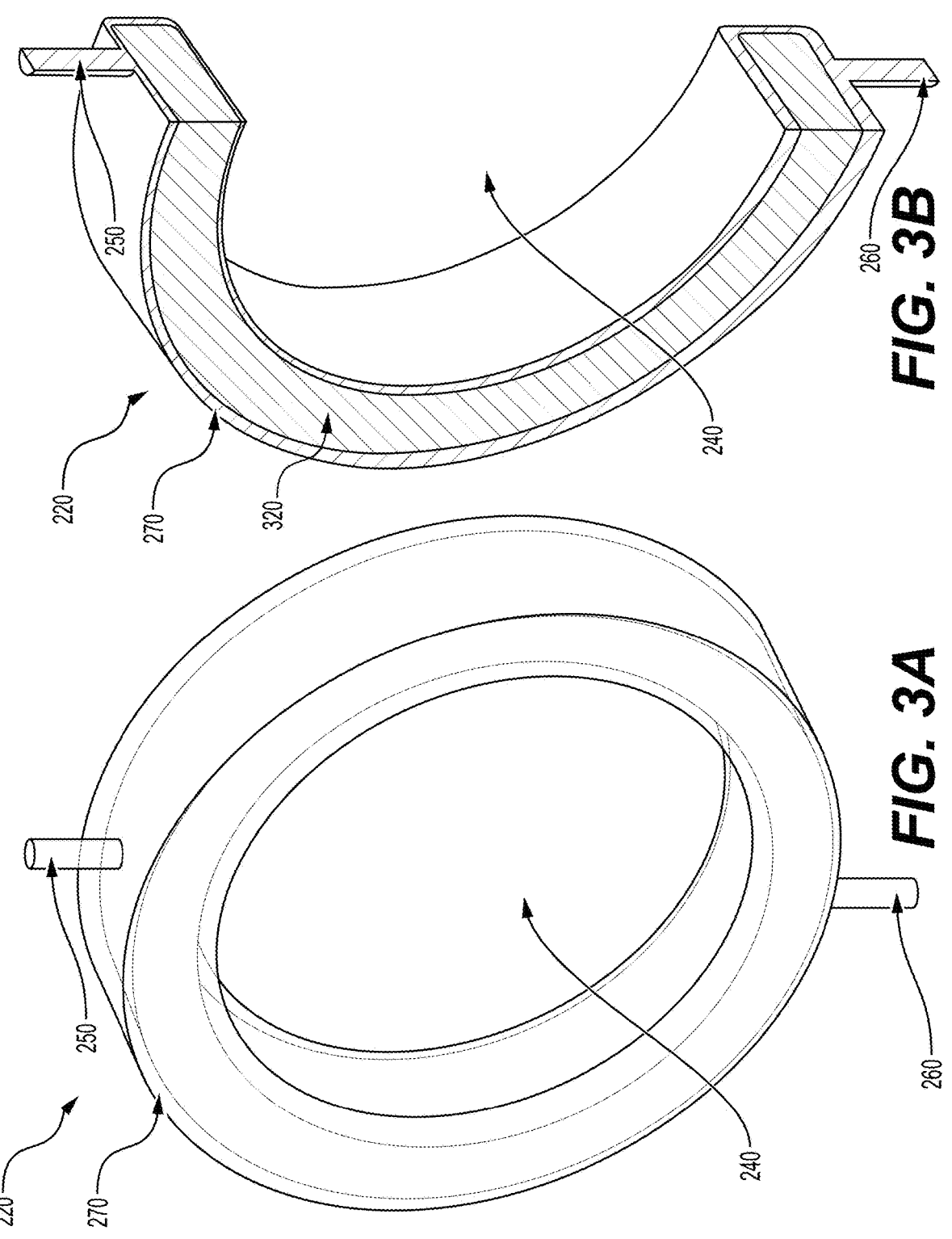
FIG. 3A and FIG. 3B depict an exemplary model view and an exemplary isometric view of an eccentric annular cover, according to one or more embodiments.

FIGS. 3A and 3B depict an exemplary model view and an exemplary isometric view of an eccentric annular cover, according to one or more embodiments. Cover 220 may include inlet 250 and outlet 260. Inlet 250 may be disposed on the body 270 of cover 220. Outlet 260 may be disposed on the body 270 of cover 220 opposite to inlet 250. Cover 220 may include central opening 240. FIG. 3B depicts a partial isometric view of cover 220, rotated relative to FIG. 3A to depict a stator side of cover 220. Cover 220 may include similar features of FIG. 3A, which will not be repeated for brevity. Cover 220 may include cavity 320.

Figure 4:
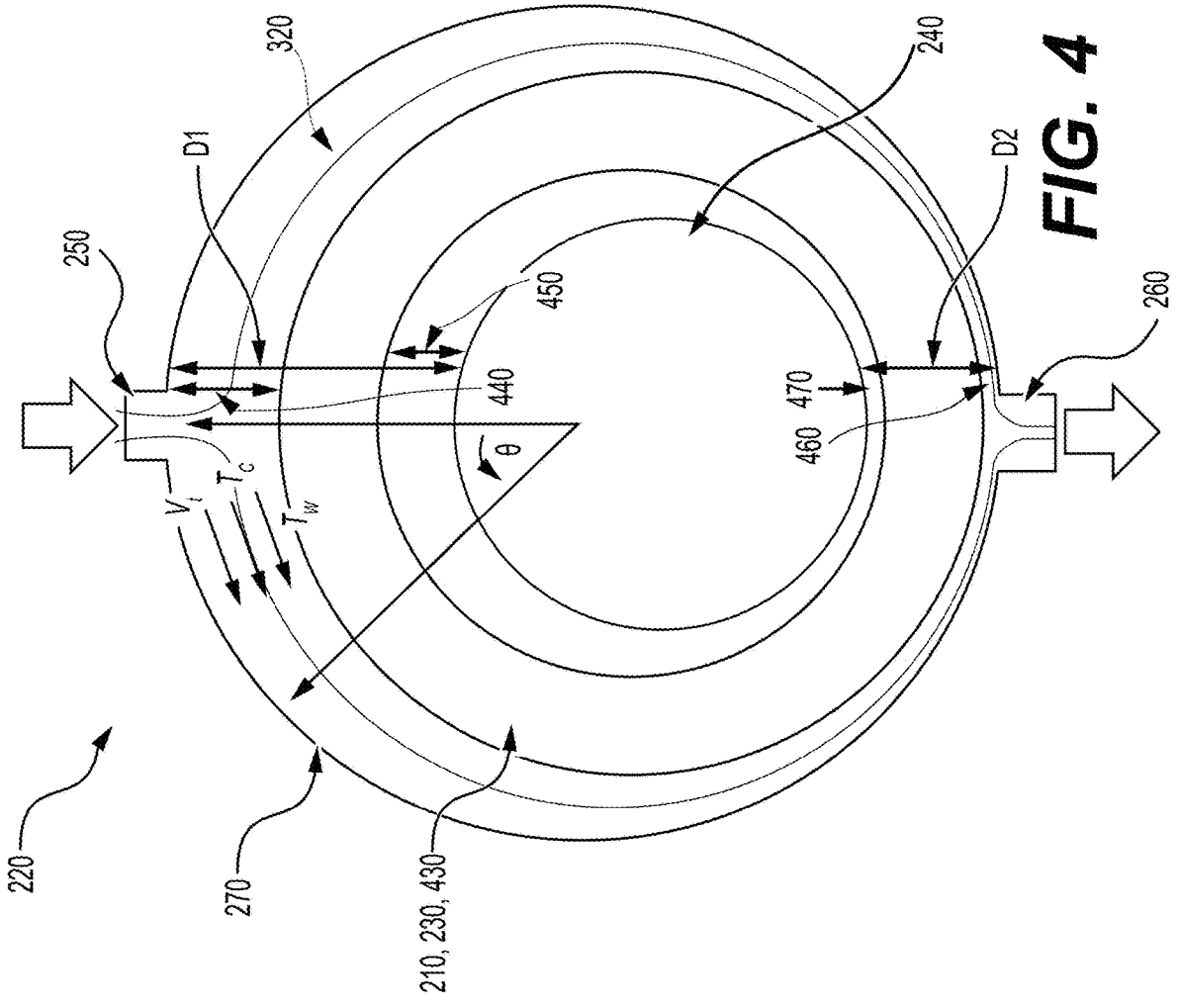
FIG. 4 depicts an exemplary eccentric annular cover, according to one or more embodiments.

FIG. 4 depicts an exemplary eccentric annular cover, according to one or more embodiments. Cover 220 may include cavity 320 surrounding windings 230 and to transfer cooling fluid throughout. Cavity 320 may include first radial width D1 and second radial width D2. First radial width D1 may be disposed at inlet 250 and the second radial width D2 may be disposed at outlet 260. Cover 220 may be connected to a stator core 430. Stator core 430 may surround rotor 130. Cooling fluid may enter inlet 250 and exit the outlet 260. For example, the cooling fluid may be transferred within cavity 320 through inlet 250 and outlet 260 for cooling the windings 230. The first radial width D1 may be greater than the second radial width D2, which may impart an eccentricity to cavity 320 and cover 220. A radial width of the cavity may be variable from the first radial width to the second radial width based on an angular position in the cavity.

First radial width D1 may include a first gap 440 and a second gap 450. First gap 440 may be a radial distance between the inner surface of cavity 320 at inlet 250 and the windings 230. Second gap 450 may be a radial distance between the windings 230 and the inner surface of cavity 320 at central opening 240 of the cover 220 at the inlet 250. For example, cooling fluid may circulate at least through first gap 440 and second gap 450. Second radial width D2 may include a third gap 460 and a fourth gap 470. Third gap 460 may be a radial distance between the inner surface of the cavity 320 at the outlet 260 and windings 230. Fourth gap 470 may be a radial distance between the windings 230 and the inner surface of the central opening 240 of the cover 220 at the outlet 260. For example, cooling fluid may circulate at least through the third gap 460 and fourth gap 470. The first radial width D1 may be from approximately one millimeter to approximately ten millimeters. The first radial width D1 may be from approximately one millimeter to approximately two millimeters. The first gap 440 may be from approximately zero millimeters to approximately ten millimeters and the second gap 450 may be from approximately zero millimeters to approximately ten millimeters. The first gap 440 may be from approximately zero millimeters to approximately two millimeters and the second gap 450 may be from approximately zero millimeters to approximately two millimeters. The third gap 460 may be from approximately zero millimeters to approximately ten millimeters and the fourth gap 470 may be from approximately zero millimeters to approximately ten millimeters. The third gap 460 may be from approximately zero millimeters to approximately two millimeters and the fourth gap 470 may be from approximately zero millimeters to approximately two millimeters.

For example, cover 220 may include an eccentricity ratio (e.g., increasing first radial width D1). The eccentricity ratio may be adjusted to fine tune the thermal behavior of windings 230 with reference to the equation listed above. Eccentricity modifies the tangential coolant velocity "$v_t$" for each angular sector. This velocity modification is a function of radial distance between the windings and cover (e.g., based on first radial width D1 and second radial width D2). For example, the higher the distance between the windings and cover (e.g. based on first radial width D1), the lower the velocity and vice versa, which is modified by eccentricity. The eccentricity ratio may include an eccentricity value between approximately zero millimeters to approximately five millimeters. Using the thermal equation above, for a given heat flow generated by winding losses "Q" and a fixed winding surface "A", the velocity has a direct impact on convective heat transfer coefficient "h", where both angular coolant "$T_c$" and winding temperatures "$T_w$" are impacted.

With the addition of a higher eccentricity value, the decrease of temperature across windings 230 may be improved. For example, the use of cover 220 including first gap 440 and third gap 460 being approximately equal may give a constant tangential velocity, leading to a constant heat transfer coefficient. However, the cooling fluid temperature may gradually increase when approaching the outlet 260. Not introducing an eccentricity value may result in the heat transfer being less efficient, leading to windings 230 temperature increases on the outlet 260 of cover 220 and windings 230. Cover 220 may include eccentricity to compensate for this effect by gradually adjusting the heat transfer coefficient h(θ).

Figure 5:
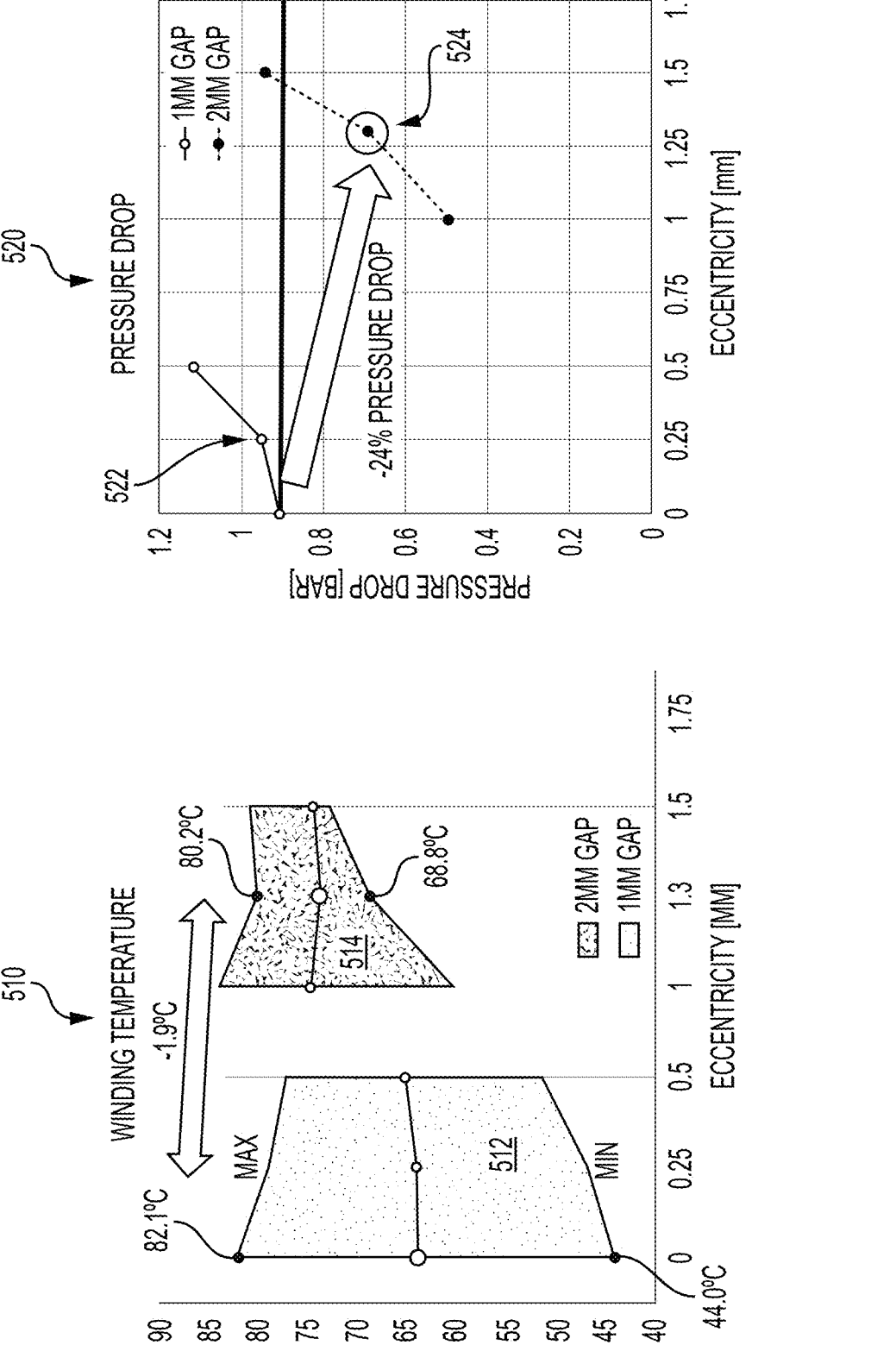
FIG. 5 depicts exemplary graphs of characteristics of an eccentric annular cover, according to one or more embodiments.

FIG. 5 depicts exemplary graphs of characteristics of an eccentric annular cover, according to one or more embodiments. Graph 510 includes plot 512 and plot 514. Plot 512 depicts the characteristics of cover 220 including first gap 440 and third gap 460 of approximately one millimeter. Introducing an eccentricity value to cover 220 may increase the distance of the first gap 440 and may decrease the distance of the third gap 460. For example, as the eccentricity value increases (e.g. from 0 to 0.5) the first gap 440 may increase from approximately 1 millimeter to approximately 1.5 millimeters and the third gap 460 may decrease from approximately 1 millimeter to approximately 0.5 millimeters. As the first gap 440 increases and the third gap 460 decreases, the maximum winding temperature may decrease and the minimum winding temperature may increase, thereby reducing end winding temperature spread.

Plot 514 depicts the characteristics of cover 220 including first gap 440 and third gap 460 of approximately two millimeters with a starting eccentricity value of approximately one millimeter. As described above, with reference to Plot 512, as the eccentricity value increases (e.g. from 1 to 1.5) the first gap 440 may increase from approximately 2 millimeters to approximately 3.5 millimeters and third gap 460 may decrease from approximately 2 millimeters to approximately 0.5 millimeters. For example, increasing the first radial width D1 by one millimeter and introducing an eccentric value of 1.3 millimeters may decrease the maximum temperature of windings 230 by 1.9 degrees Celsius, the windings 230 temperature may reach a minimum value (e.g., eccentricity may be optimum at 1.3 millimeters). Similar to plot 512, as the eccentricity value increases (e.g. from 1 to 1.5) the winding temperature may decrease.

Graph 520 includes plot 522 and plot 524. Plot 522 corresponds to plot 512 of graph 510. Plot 524 corresponds to plot 514 of graph 510. Plot 522 depicts the pressure of the overall system (e.g., pressure difference between inlet 250 and outlet 260 for a given fluid flow rate at a certain temperature (e.g., 5 L/min at 20 degrees Celsius)) when cover 220 includes a first gap 440 of approximately one millimeter and a starting eccentricity value of approximately zero. Plot 524 depicts the pressure of the overall system when cover 220 includes a first gap 440 of approximately two millimeters and a starting eccentricity value of approximately one millimeter. As depicted in plot 522 and plot 524, the initial pressure drop in plot 524 may be significantly reduced, reducing the overall system pressure drop by including an increase of first gap 440 and an increased eccentricity value. It may be important to ensure setting a correct eccentricity value to avoid any significant additional pressure drop.

Figure 6:
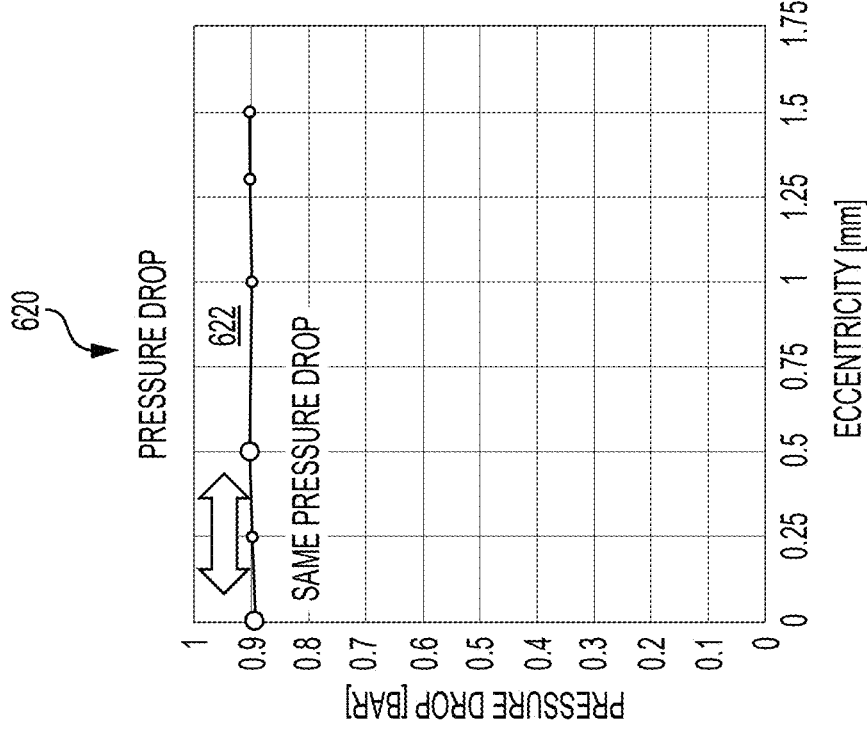
FIG. 6 depicts exemplary graphs of characteristics of an eccentric annular cover, according to one or more embodiments.
Figure 6:
Figure 6:
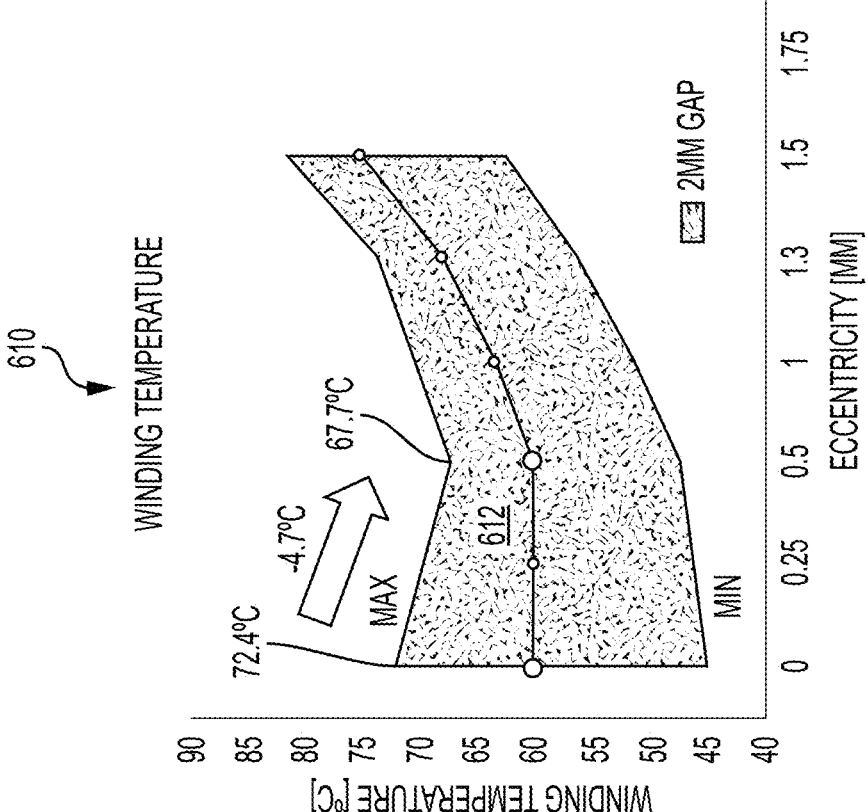

FIG. 6 depicts exemplary graphs of characteristics of an eccentric annular cover, according to one or more embodiments. Graph 610 includes plot 612. Plot 612 depicts the characteristics of cover 220 including a first gap 440 of two millimeters and a starting eccentricity value of zero millimeters while maintaining substantially the same pressure drop through the system. For example, as the eccentricity increases (e.g., from zero to 1.5 millimeters) the temperature of windings 230 decreases by 4.7 degrees Celsius until the eccentricity value is approximately 0.5 millimeters, and then the temperature increases. When the eccentricity value is increased substantially, there may be significant temperature increase across and additional hot spot areas on the windings 230.

Graph 620 includes plot 622. Plot 622 depicts the pressure of the overall system when cover 220 includes first gap 440 of two millimeters and a starting eccentricity value of zero. For example, the pressure of the overall system in approximately maintained throughout the entirety of the eccentricity value increasing from approximately zero to approximately 1.5 millimeters. Maintaining the pressure within the overall system may be completed by modifying the flow rate of the cooling fluid at the inlet 250. For example, the flow rate may be increased at the inlet 250.

An advantage of incorporating eccentricity into an annular cover may be the ability to reduce the temperature spread of the windings during operation (corresponding to $T_{w\_max}-T_{w\_min}$). For example, the overall winding temperature may be reduced, which may allow the motor to be driven with more current and may allow the motor to achieve a higher continuous power. Additional advantages may be delivering more continuous power and torque, and/or increased efficiency ratio peaks/continuous of approximately 1.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   a motor including:
      a rotor;
      a stator disposed around the rotor, wherein the stator includes a stator core and one or more windings, wherein the one or more windings include one or more end windings extending from a longitudinal end of the stator core; and
      a cover for the one or more end windings and disposed around the rotor, wherein the cover is configured to transfer a cooling fluid to cool the one or more end windings, and wherein the cover includes:
         a body to cover the one or more end windings, the body including a cavity for the cooling fluid;
         an inlet disposed in the body for the cooling fluid to enter the cavity; and an outlet disposed in the body for the cooling fluid to exit the cavity, wherein the outlet is disposed at a portion of the body opposite to the inlet, wherein a first radial width of the cavity at the inlet is greater than a second radial width of the cavity at the outlet.

2. The system of claim 1, wherein a radial width of the cavity is variable from the first radial width to the second radial width based on an angular position in the cavity.

3. The system of claim 1, wherein the cover is connected to the stator core.

4. The system of claim 1, wherein the first radial width of the cavity includes a first gap between an inner surface of the cavity at the inlet and the one or more end windings and a second gap between the one or more end windings and an inner surface of a central opening of the cover at the inlet.

5. The system of claim 4, wherein the second radial width includes a third gap between the inner surface of the cavity at the outlet and the one or more end windings and a fourth gap between the one or more end windings and an inner surface of the central opening of the cover at the outlet.

6. The system of claim 5, wherein the first gap and the second gap are configured to transfer cooling fluid.

7. The system of claim 4, wherein the first gap is from approximately one millimeter to approximately ten millimeters.

8. The system of claim 1, wherein the first radial width and the second radial width include an eccentricity value.

9. The system of claim 8, wherein the eccentricity value is greater than zero millimeters and less than five millimeters.

10. The system of claim 1, wherein a cooling fluid pressure drop in the cover is substantially constant.

11. The system of claim 1, further including:

an inverter to convert DC power from a battery to AC power to drive the motor; and the battery configured to supply the DC power to the inverter, wherein the system is provided as a vehicle including the inverter, the battery, and the motor.

12. A system comprising:

a stator including:

a stator core;

one or more windings, wherein the one or more windings include one or more end windings extending from a longitudinal end of the stator core; and a cover for the one or more end windings and to be disposed around a rotor, wherein the cover is configured to transfer a cooling fluid to cool the one or more end windings, and wherein the cover includes:

a body to cover the one or more end windings, the body including a cavity for the cooling fluid;

an inlet disposed in the body for the cooling fluid to enter the cavity; and an outlet disposed in the body for the cooling fluid to exit the cavity, wherein the outlet is disposed at a portion of the body opposite to the inlet, wherein a first radial width of the cavity at the inlet is greater than a second radial width of the cavity at the outlet.

13. The system of claim 12, wherein the cover is connected to the stator core.

14. The system of claim 12, wherein the first radial width of the cavity includes a first gap between an inner surface of the cavity at the inlet and the one or more end windings and a second gap between the one or more end windings and an inner surface of a central opening of the cover at the inlet.

15. The system of claim 14, wherein the first gap is from approximately one millimeter to approximately ten millimeters.

16. A system comprising:

a cover including:

a body to be disposed around a rotor and to cover one or more end windings extending from a longitudinal end of a stator core, the body including a cavity for a cooling fluid;

an inlet disposed in the body for the cooling fluid to enter the cavity; and an outlet disposed in the body for the cooling fluid to exit the cavity, wherein the outlet is disposed at a portion of the body opposite to the inlet, wherein a first radial width of the cavity at the inlet is greater than a second radial width of the cavity at the outlet.

17. The system of claim 16, wherein a radial width of the cavity is variable from the first radial width to the second radial width based on an angular position in the cavity.

18. The system of claim 16, wherein the first radial width of the cavity includes a first gap between an inner surface of the cavity at the inlet and the one or more end windings and a second gap between the one or more end windings and an inner surface of a central opening of the cover at the inlet, wherein the first gap is from approximately one millimeter to approximately ten millimeters.

19. The system of claim 18, wherein the second radial width of the cavity includes a third gap between the inner surface of the cavity at the outlet and the one or more end windings and a fourth gap between the one or more end windings and an inner surface of the central opening of the cover at the outlet.

20. The system of claim 18, wherein the first gap is from approximately one millimeter to approximately ten millimeters.

* * * * *